3,338,987
STABILIZATION OF ACRYLONITRILE POLYMERS
Eli Perry, Raleigh, N.C., assignor to Monsanto Company, St. Louis, Mo., a corporation of Delaware
No Drawing. Filed June 19, 1963, Ser. No. 288,925
2 Claims. (Cl. 260—898)

The present invention relates to acrylonitrile polymers stabilized with respect to degradation by heat. More particularly, it relates to polymeric compositions of matter comprising acrylonitrile polymers and polystyrene which have manifestly improved thermal stability over either of these polymers alone.

Both polyacrylonitrile and polystyrene are relatively unstable materials in that they are known to undergo undesirable physical and chemical changes when subjected to elevated temperatures. Their adaptability to some uses is consequently limited because of the need for extruding and molding the polymers at elevated temperatures and, further, because many of the useful end products fabricated from them must function in an environment where they are subjected to elevated temperatures. Attempts to improve the thermal stability of either or both of these polymers have been made. For example, structural changes in the polymers have been effected by changing polymerization conditions but this approach has not led to a substantial improvement. The addition of stabilizers has been another technique tried which has met with varying degrees of success. Since stabilizers suitable with one of the polymers may or may not function with the other, however, it is difficult to obtain desired characteristics by this method. Thus, much room remains for further improvement in this area.

It is an object of the present invention, therefore, to provide compositions comprising acrylonitrile polymers and polystyrene having improved heat stability.

It is another object of the invention to provide compositions comprising acrylonitrile polymers and polystyrene which are adapted for molding and processing procedures without the danger of degradation usually encountered in the polymers of the art at the elevated temperatures employed in such procedures.

Other objects and advantages of the invention which will become apparent from the following description and accompanying claims are attained by admixing or intimately incorporating in preformed acrylonitrile polymers amounts from about 0.25 to about 95% by weight of preformed polystyrene. The resulting compositions exhibit improved resistance to decomposition by heat over either the acrylonitrile polymers alone or polystyrene alone and are useful for many purposes, among which may be mentioned manufacture of electrical components, insulation, binders for fillers, and the like.

The compositions of the invention are usually prepared by dissolving the polymers in a mutual solvent in which both are readily soluble, such as dimethylformamide, for example, mixing them thoroughly and then precipitating the polymeric composition from the solution by the addition of an excess of a liquid organic compound in which both the acrylonitrile polymer and polystyrene are insoluble such as methanol, for example, filtering, and drying the precipitated blend. Direct blending on a mill roll is not as satisfactory as coprecipitation for obtaining an intimate or homogeneous blend of these polymers because of their widely different cohesive energy densities. Other solvents may be used in preparing the blends by this method, e.g., dioxanone is useful at elevated temperatures. Precipitating agents in addition to methanol which can be used include other alcohols such as ethanol, propanol, butanol, hexanol, ethylene glycol, phenol, benzyl alcohol, and the like; paraffinic hydrocarbons such as hexane, octane, dodecane, and the like; and ethers such as methyl ether, ethyl ether, propyl ether, methyl butyl ether, ethyl butyl ether, and the like. The precipitating agent can be acidified with, for example, hydrochloric acid to enhance the coagulation. Other acids such as sulfuric, acetic, oxalic, and butyric may be used.

Amounts of polystyrene ranging from as little as 0.25% to as much as 95% may be blended with acrylonitrile polymers to obtain homogeneous compositions wherein mutual stabilization against heat deterioration is provided. Preferably, amounts from about 0.5% to about 30% by weight of polystyrene are intimately incorporated into the acrylonitrile polymer to obtain blends or compositions having improved heat stability over the acrylonitrile polymer.

Small amounts of dyes, colors, pigments, plasticizers, and like additives may be incorporated in the composition without affecting the general characteristics of the blend. Such additives when used are usually employed in amounts from about 0.5 to about 10% by weight of the blend.

The following examples are given to illustrate the invention but are not to be construed as limiting it in any manner whatsoever.

Example 1

Acrylonitrile was polymerized in an aqueous system at 40° C. using a potassium thiosulfate-sodium bisulfite redox initiator to yield polyacrylonitrile having a degree of polymerization of 460.

Styrene was polymerized thermally at 100° C. and freed of low molecular weight substances by solution in toluene and reprecipitation in methanol, followed by filtration and drying. The degree of polymerization of the polystyrene so produced was 1400.

About 2.5 g. of the polyacryonitrile was dissolved in 30 cc. of dimethylformamide and 47.5 g. of polystyrene was dissolved in 500 cc. of dimethylformamide. The solutions were mixed thoroughly. Two phases were evident but these were well dispersed in each other. Excess methanol, acidified with hydrochloric acid, was added to the mixture to precipitate the polymers, and the resulting slurry was filtered. Methanol was added to the polymer cake and the suspension was allowed to stand for several days, after which it was again filtered. The polymer precipitate was air dried, then dried in an oven at 60° C. for 24 hr. at 1 mm. Hg and densified by milling on laboratory compounding rolls at a temperature from about 185–195° C. The resulting sheets were ground in an Abby cutter to give a homogeneous blend in the form of a fine powder.

Samples of the polyacrylonitrile, the polystyrene and the polyacrylonitrile-polystyrene blend were subjected to thermogravimetric analysis by heating in vacuum at a rate of 6° per minute. From the decomposition temperatures tabulated below, it will be seen that polyacrylonitrile and polystyrene in the blend exert a mutual stabilization effect, i.e., cause a rise in the temperature at which degradation of each polymer occurs.

|  | Decomposition, temp (° C.) |
|---|---|
| Polyacrylonitrile | 285. |
| Polystyrene | 385. |
| Blend | 325 (polyacrylonitrile component). <br> 410 (polystyrene component). |

Example 2

Homogeneous blends of polyacrylonitrile with varying amounts of polystyrene were prepared in the manner described in Example 1. Samples of these together with a control sample of polyacrylonitrile were subjected to differential thermal analysis at a heating rate of 2° per minute and the temperature of the first major chemical change (exothermic reaction) occurring was observed. The data tabulated below demonstrate that the intimate admixture of polystyrene with polyacrylonitrile produces polymer compositions which are clearly superior to polyacrylonitrile itself with respect to thermal stability.

| Polyacrylonitrile (Percent) | Polystyrene (Percent) | Temperature of First Major Chemical Change (° C.) |
|---|---|---|
| 100 | 0 | 210 |
| 99 | 1 | 226 |
| 90 | 10 | 247 |
| 70 | 30 | 230 |

What is claimed is:
1. A composition of matter consisting of an intimate homogeneous admixture of polyacrylonitrile and from about 0.25% to about 95% by weight of polystyrene.
2. A composition of matter consisting of an intimate homogeneous admixture of polyacrylonitrile and from about 0.5% to about 30% by weight of polystyrene.

References Cited

UNITED STATES PATENTS 2,700,657  1/1955  Look et al. _____ 260—898

OTHER REFERENCES

Mast et al.: Abbreviature of application Ser. No. 48,543, published April 29, 1952, 657 O.G. 1584, class 260–898.

MURRAY TILLMAN, *Primary Examiner.*

J. L. WHITE, *Assistant Examiner.*